No. 719,101. PATENTED JAN. 27, 1903.
W. C. FOLANT.
WASHER FOR VEHICLE AXLES.
APPLICATION FILED JULY 31, 1901.
NO MODEL.
Fig. 1
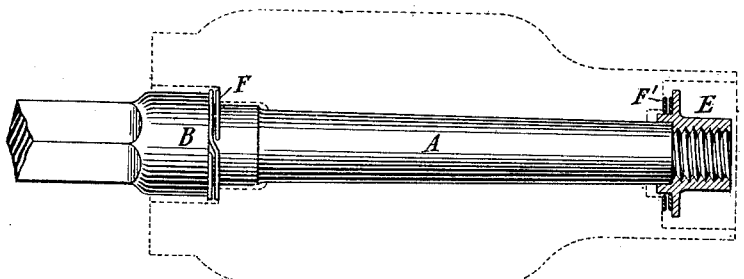
Fig. 2    Fig. 3    Fig. 4
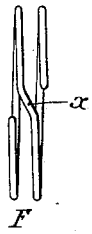  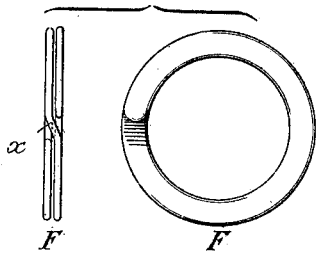
Witnesses:     Inventor
Raphael Netter     William Chester Folant
L. T. Shaw     by E. M. Bentley Att'y.
THE NORRIS PETERS CO., PHOTO-LITHO., WASHINGTON, D. C.

UNITED STATES PATENT OFFICE.

WILLIAM CHESTER FOLANT, OF NEWARK, NEW JERSEY.

WASHER FOR VEHICLE-AXLES.

SPECIFICATION forming part of Letters Patent No. 719,101, dated January 27, 1903.

Application filed July 31, 1901. Serial No. 70,309. (No model.)

*To all whom it may concern:*

Be it known that I, WILLIAM CHESTER FOLANT, a citizen of the United States, residing at Newark, county of Essex, State of New Jersey, have invented certain new and useful Improvements in Washers for Vehicle-Axles, of which the following is a specification, reference being made to the accompanying drawings, wherein—

Figure 1 is a side elevation, partly in section, of an axle illustrating my invention. Fig. 2 is a side elevation of the spring-washer when expanded. Fig. 3 is a vertical section of the said washer, and Fig. 4 is a side elevation of the same when compressed.

My invention relates to a vehicle-axle with which is combined a metallic washer, as will be hereinafter described.

Heretofore it has been the almost universal practice with wagon, carriage, and other vehicle axles to employ washers of leather or cork intervening between the wheel-box and a shoulder on the base of the axle and also between the said box and the nut on the outer end of the axle for the purpose of taking up end play and keeping out the dust. Such washers are subject to wear and other vicissitudes, which soon destroy them, while the repeated replacement of them is a cause of annoyance and expense, and they have no substantial range of resiliency. It has also been heretofore proposed to employ a metallic washer composed of a spiral spring; but such washers require at least four turns in order to secure the necessary flexibility, which causes them to occupy too great a space longitudinally on the axle. They are also expensive to make, as the outer turns have to be ground off over nearly the whole turn, which is a costly operation and which also makes the metal of an uneven strength, with an unequal pressure on the box and axle, besides causing other troubles, which have rendered them impracticable. They also require a special construction of box and axle, while my washer may be substituted for cork and leather washers in the standard forms of box and axle heretofore used. In my invention I have replaced such washers by a metallic washer of a peculiar construction adapted particularly to serve in connection with the moving wheel-box and to occupy no more space than has been ordinarily occupied by the other washers aforesaid.

Referring to the accompanying drawings, A is a wheel-axle having at its base a shoulder B.

E is the nut, screwed to the outer end of the axle A.

It will be understood that the wheel-box is to surround the axle between the shoulder B and the nut E and also surround the said shoulder and nut, as shown by the dotted lines. Upon this axle I place one or more metallic washers F and F', constructed as indicated in Figs. 2, 3, and 4. These washers are formed of bent or coiled strips of spring metal, preferably steel, each washer comprising two turns or leaves of such spring metal connected by an offset at the point *x*, Fig. 2, the offset being resilient, so as to permit of a spring action when the two leaves are substantially parallel at right angles to the axle. The two turns of the spring-strip are separated from each other, as shown in Fig. 2, when fully expanded, but when in place are adapted to be pressed somewhat together, as shown in Fig. 1, with the turns parallel to each other and at right angles to the axle. The spring is then in a condition to be still further compressed, as shown in Fig. 4, or to be expanded, while the turns remain still in contact throughout their entire circumference with the box and axle, respectively. The cross-section of the spring-strip is shown in Fig. 3, the radial dimension of the strip being considerably in excess of the longitudinal dimension, although I do not limit myself to those dimensions.

The washer F, made as aforesaid, is slipped over the outer end of the axle and rests against the shoulder B, and the wheel is then put in place and the second washer F' placed against the end of the box, and the nut E is then screwed on to hold it in place, the two washers being under compression when in their normal position between the box and the shoulder B on the one hand and the nut E on the other.

A metallic spring-washer constructed as aforesaid has been proved to possess striking advantages over the cork and leather washers heretofore employed in that it does not wear out, but will last as long as the axle itself and by reason of its shape will be equally efficient in excluding dust and taking up any end play of the wheel. Moreover, it does not deteriorate and has exactly the same thickness and resiliency at all times and prevents any looseness and rattling of the wheel on the axle, whereas in previous constructions the wearing of the washers, which occurs in a short time, causes looseness between the wheel and axle, which in turn serves to increase the wear by the constant impact of the loose box against the washer. It is also to be observed that a two-leafed spring such as I have shown gives a uniform spring-bearing against the collar on one side and the box on the other side and also has a positive spring action, which is lacking in cork or leather washers and which tends to center the box at all times between the shoulder and the nut.

What I claim as new, and desire to secure by Letters Patent, is—

1. The combination with a vehicle-axle and a surrounding wheel-box of one or more metallic spring-washers consisting each of two circular turns of a free-ended metallic strip, the two turns lying at right angles to the axle between vertical faces on the said axle and the box respectively and connected by a resilient offset.

2. The combination with a non-rotating vehicle-axle and a wheel-box rotating thereon of one or more circular metallic spring-washers lying loosely between the said axle and the said box and consisting of two turns of a free-ended metallic strip connected by a resilient offset.

3. The combination with a vehicle-axle having a shoulder at its rear end of a wheel-box surrounding both the axle and the shoulder and a circular metallic washer loosely surrounding the axle between the said shoulder and an internal shoulder on the wheel-box and consisting of two circular turns of a free-ended metallic spring-strip lying at right angles to the axle and connected by a resilient offset.

4. A metallic spring-washer for vehicle-axles consisting of two circular turns of a free-ended metallic spring-strip adapted to lie at right angles to the axle and connected by a resilient offset, the two turns being normally separated so as to be compressed together when in position on the axle and the washer being adapted to loosely surround the axle between the vertical face of a shoulder or projection on the axle and the rotating box.

In witness whereof I have hereunto set my hand, before two subscribing witnesses, this 25th day of July, 1901.

WILLIAM CHESTER FOLANT.

Witnesses:
G. W. HOPKINS,
L. T. SHAW.